(12) United States Patent
Veilleux

(10) Patent No.: US 9,146,024 B2
(45) Date of Patent: Sep. 29, 2015

(54) LED LIGHTING MODULE, LED LIGHTING SYSTEM AND LED LIGHTING RETROFIT KIT

(71) Applicant: SEVLights, Varennes (CA)

(72) Inventor: Daniel Veilleux, Longueuil (CA)

( * ) Notice: Subject to any disclaimer, the term of this patent is extended or adjusted under 35 U.S.C. 154(b) by 179 days.

(21) Appl. No.: 13/901,023

(22) Filed: May 23, 2013

(65) Prior Publication Data

US 2014/0233225 A1 Aug. 21, 2014

Related U.S. Application Data

(60) Provisional application No. 61/767,109, filed on Feb. 20, 2013.

(51) Int. Cl.
*F21V 19/00* (2006.01)
*F21K 99/00* (2010.01)
*F21Y 101/02* (2006.01)
*F21Y 103/00* (2006.01)

(52) U.S. Cl.
CPC ............... *F21V 19/0085* (2013.01); *F21K 9/17* (2013.01); *F21Y 2101/02* (2013.01); *F21Y 2103/003* (2013.01)

(58) Field of Classification Search
USPC .................. 362/249.02, 217.16, 217.17, 254
See application file for complete search history.

(56) References Cited

U.S. PATENT DOCUMENTS

2011/0090682 A1 4/2011 Zheng et al.
2012/0162987 A1* 6/2012 Liu et al. .................. 362/249.02
2012/0206909 A1 8/2012 Morgan
2012/0212951 A1* 8/2012 Lai et al. ..................... 362/218
2012/0307524 A1* 12/2012 Schapira et al. ............. 362/652
2012/0327646 A1* 12/2012 Ivey et al. .................... 362/218
2013/0063944 A1* 3/2013 Lodhie et al. ............ 362/249.02
2013/0128574 A1* 5/2013 Ivey et al. .................... 362/235

FOREIGN PATENT DOCUMENTS

EP 2385292 A 11/2011
GB 2434041 A 7/2007

OTHER PUBLICATIONS

International Search Report for PCT/CA2014/000125.
Written Opinion of PCT/CA2014/000125.

* cited by examiner

*Primary Examiner* — Laura Tso
(74) *Attorney, Agent, or Firm* — Benoît & Côté Inc.

(57) ABSTRACT

The present document describes a LED lighting module forming part of a LED lighting system comprising a troffer, the LED lighting module comprising: a mounting surface comprising a first end and a second end; light emitting diodes (LEDs) located on the mounting surface; a LED module electrical connector assembly located proximate the first end, the LED module electrical connector assembly for releasably connecting to an electrical retrofit connector assembly located proximate a first end of the troffer, the LED module electrical connector assembly for electrically connecting to the LEDs; and a LED module mechanical connector assembly located proximate the second end for releasably connecting to a mechanical connector assembly located proximate a second end of the troffer, the LED module mechanical connector assembly for releasably and mechanically connecting the LED lighting module to the troffer.

16 Claims, 11 Drawing Sheets

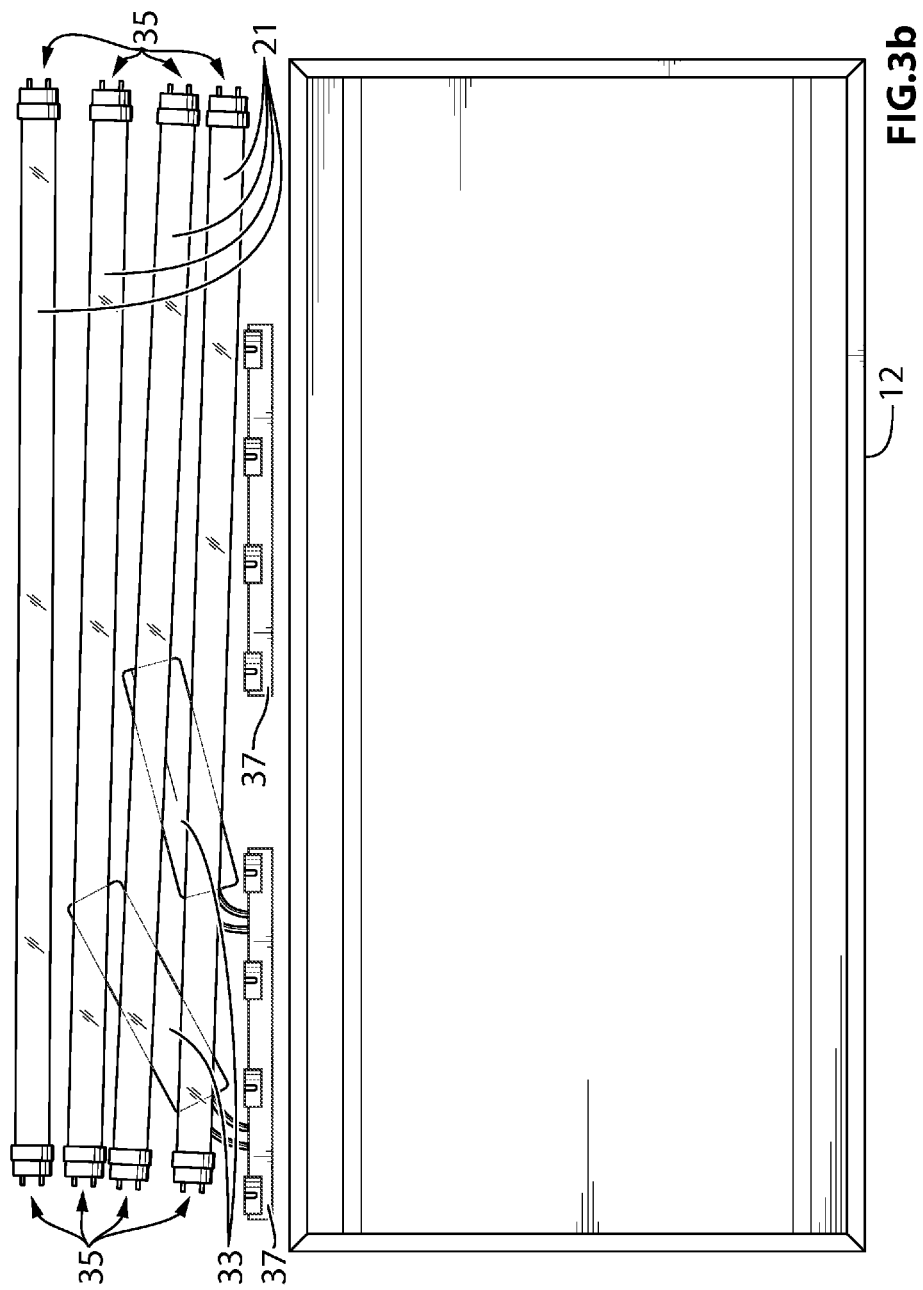

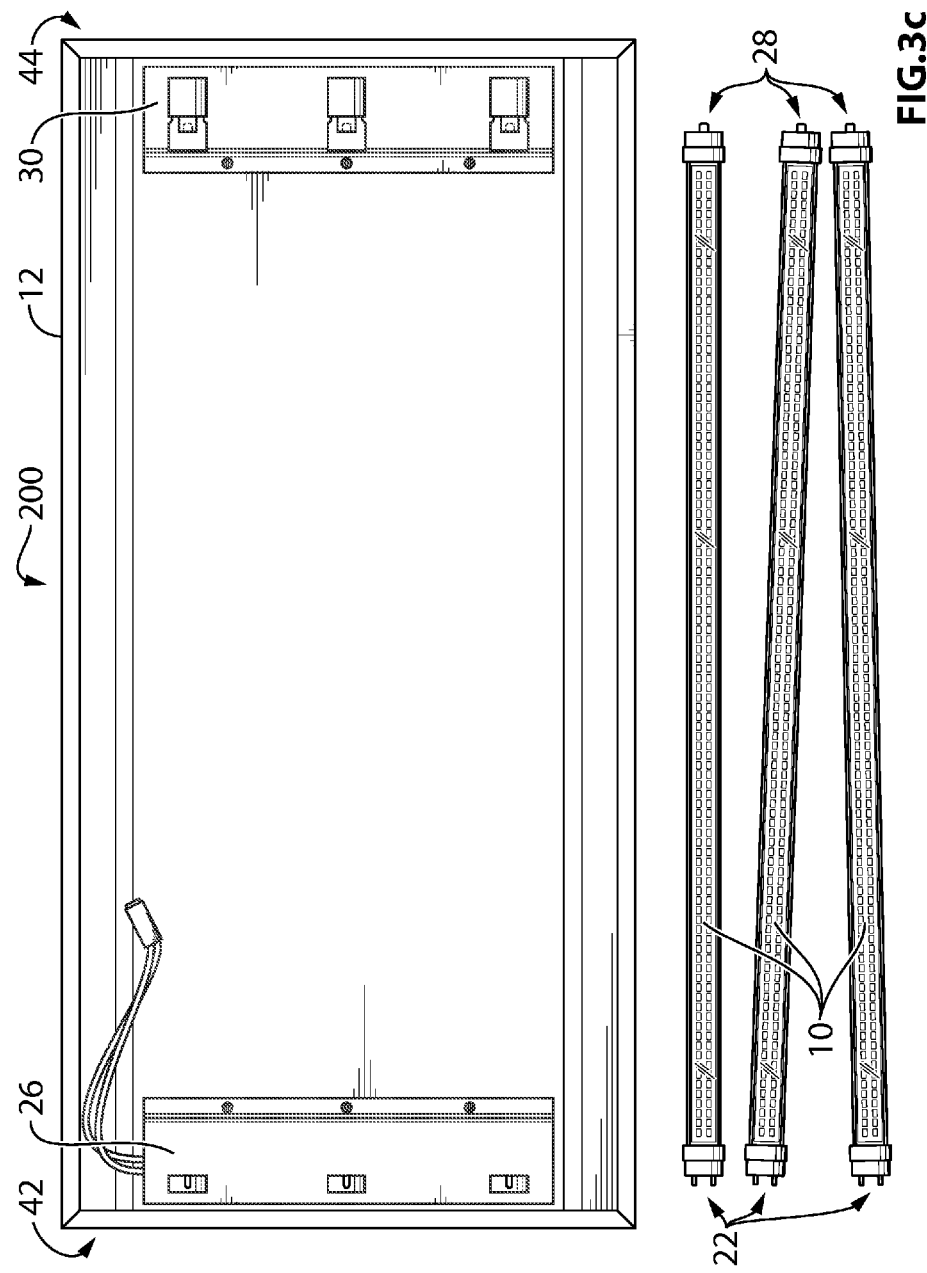

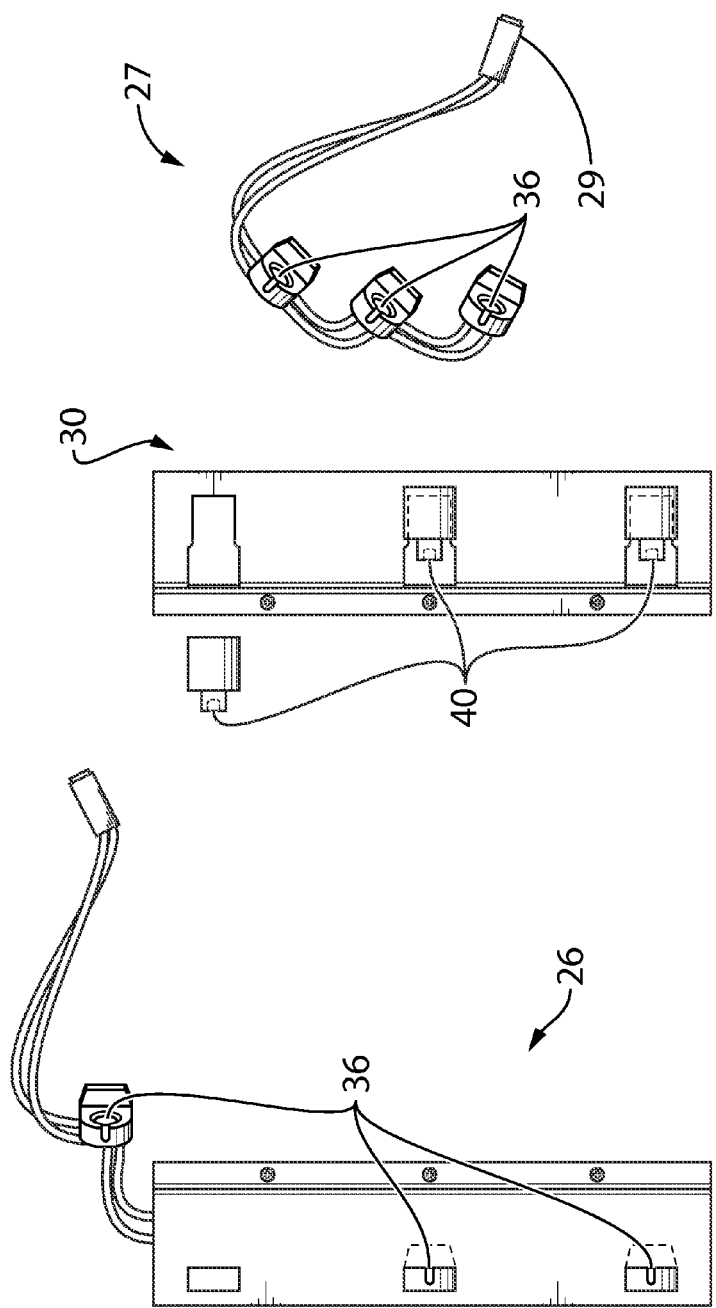

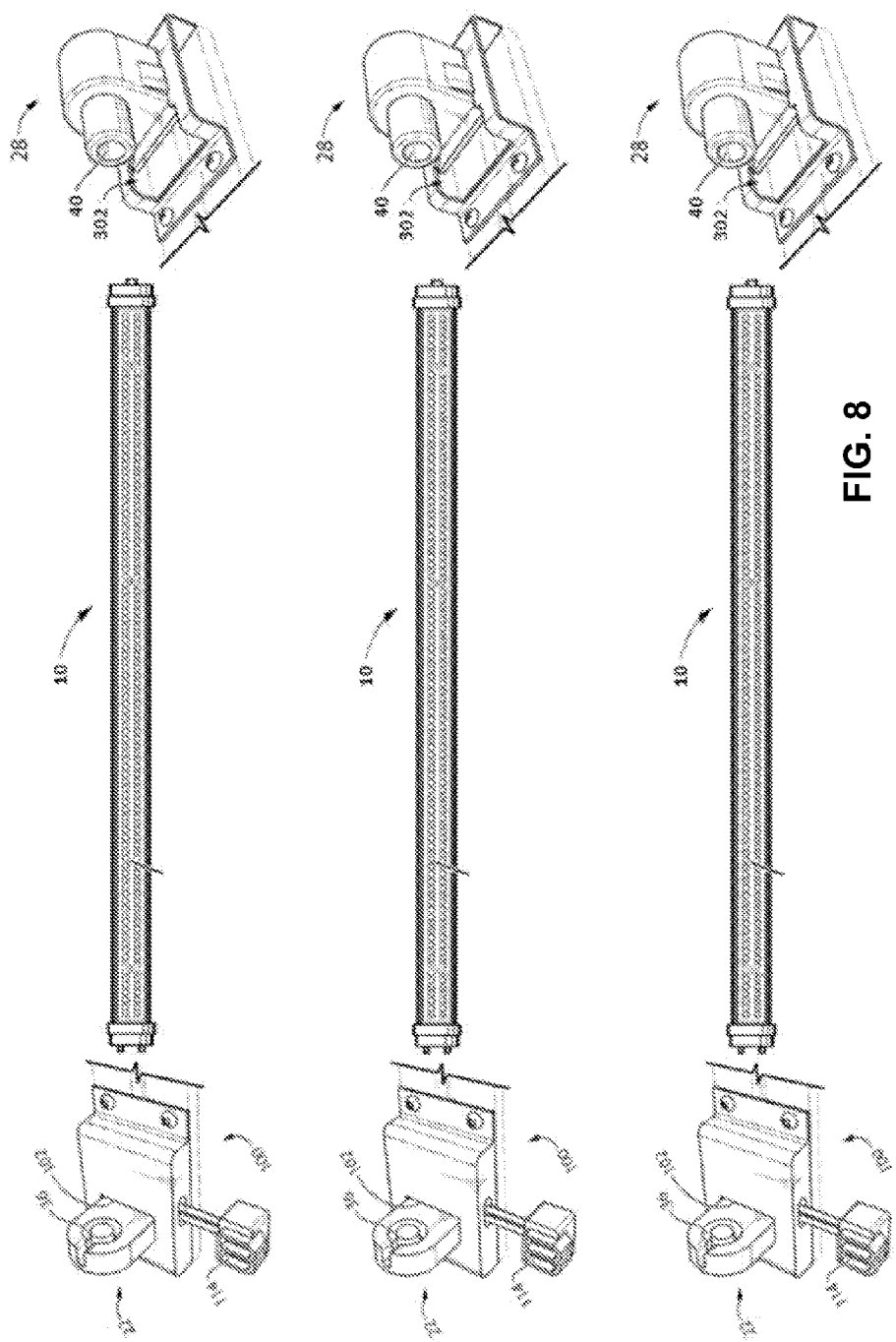

LED LIGHTING MODULE, LED LIGHTING SYSTEM AND LED LIGHTING RETROFIT KIT

CROSS-REFERENCE TO RELATED APPLICATIONS

This application claims priority under 35 USC §119(e) of U.S. provisional patent application 61/767,109 filed Feb. 20, 2013, the specification of which is hereby incorporated by reference.

BACKGROUND (a) Field

The subject matter disclosed generally relates to electrical lighting devices and systems. More particularly, the subject matter disclosed relates to LED lighting devices, LED lighting systems and LED lighting kits.

(b) Related Prior Art

Light emitting diodes (LEDs) have many advantages over fluorescent lights. LEDs are more efficient, last longer, and are less sensitive to vibrations and low temperatures. To take advantage of the benefits of LEDs, lights in the shape of conventional fluorescent tubes have been constructed in the past to include LEDs. However, the troffer in which tubes are suspended are usually not designed for receiving such LED lighting modules in the shape of conventional fluorescent tubes.

There is therefore a need for LED lighting modules, LED lighting systems and LED lighting retrofit kits to overcome the prior art disadvantages.

SUMMARY

According to another embodiment, there is provided a LED lighting retrofit kit for installation on a support member. The LED lighting retrofit kit comprises:
- an electrical retrofit connector assembly for installation on the support member, the electrical retrofit connector assembly for electrical connection to an external power source;
- a mechanical connector assembly for installation on the support member at a predetermined distance from the electrical retrofit connector assembly; and
- a LED lighting module for releasably connecting between the electrical retrofit connector assembly and the mechanical connector assembly, the LED lighting module comprising:
  - a LED module electrical connector assembly for releasably electrically connecting to the electrical retrofit connector assembly; and
  - a LED module mechanical connector assembly for releasably mechanically connecting to a mechanical connector assembly.

According to yet another embodiment, the connection between the LED module mechanical connector assembly and the mechanical connector assembly is exclusively mechanical, that is, without any electrical connection.

According to another embodiment, the electrical retrofit connector assembly comprises a recess and the LED module electrical connector assembly comprises a pin member for electrically connecting to the recess on the electrical retrofit connector assembly.

According to a further embodiment, the LED module electrical connector assembly comprises a plurality of spaced apart pin members.

According to yet another embodiment, the mechanical connector assembly comprises a recess and the LED module mechanical connector assembly comprises a projecting portion for releasably connecting to the recess on the mechanical connector assembly.

According to yet another embodiment, the electrical retrofit connector assembly comprises an electrical receiving element.

According to yet another embodiment, the electrical receiving element is substantially closed and comprises an opening allowing passage of electrical wiring.

According to yet another embodiment, the LED lighting retrofit kit further comprises an attachment portion extending from the electrical receiving element, the attachment portion for mounting to the support member.

According to yet another embodiment, the mechanical connector assembly comprises a mechanical receiving element.

According to yet another embodiment, the LED lighting retrofit kit further comprises an attachment portion extending from the mechanical receiving element, the attachment portion for mounting to the support member.

According to another embodiment, there is provided a LED lighting system for connection to a power source. The LED lighting system comprises:
- a troffer defining a first end and a second end;
- an electrical retrofit connector assembly located proximate the first end of the troffer and for electrical connection to the power source; and
- a mechanical connector assembly located proximate the second end of the troffer;
- a LED lighting module for releasably connecting between the electrical retrofit connector assembly and the mechanical connector assembly, the LED lighting module comprising:
  - a LED module electrical connector assembly for releasably electrically connecting to the electrical retrofit connector assembly; and
  - a LED module mechanical connector assembly for releasably mechanically connecting to a mechanical connector assembly.

According to a further embodiment,
- the electrical retrofit connector assembly comprises a plurality of electrical retrofit connector assemblies spaced apart and proximate the first end of the troffer;
- the mechanical connector assembly comprises a plurality of mechanical connector assemblies spaced apart and proximate the second end of the troffer; and
- the LED lighting system comprises a plurality of LED lighting modules for connection between a respective pair made of one electrical retrofit connector assembly of the a plurality of electrical retrofit connector assemblies and one mechanical connector assembly of the plurality of mechanical connector assemblies.

According to yet another embodiment, the LED module electrical connector assembly comprises a pin member electrically connected to a corresponding recess on the electrical retrofit connector assembly.

According to another embodiment, the LED module electrical connector assembly comprises a plurality of spaced apart pin members electrically connected to a plurality of corresponding recesses on the electrical retrofit connector assembly.

According to a further embodiment, the LED module mechanical connector assembly comprises a projecting portion releasably connected to a corresponding recess on the mechanical connector assembly.

According to an embodiment, there is provided a LED lighting module forming part of a LED lighting system comprising a mechanical connector assembly and for connection to an external power source, the LED lighting module comprising:

light emitting diodes (LEDs);
a LED module electrical connector assembly for releasably electrically connecting to the external power source; and
a LED module mechanical connector assembly for releasably mechanically connecting to the mechanical connector assembly.

According to another embodiment, the LED lighting module further comprises a mounting surface on which are mounted the LEDs.

According to a further embodiment, the LED lighting system further comprises an electrical retrofit connector assembly which comprises a recess, the LED module electrical connector assembly comprises a pin member for electrically connecting to the recess on the electrical retrofit connector assembly.

According to yet another embodiment, the LED module electrical connector assembly comprises a plurality of spaced apart pin members.

According to another embodiment, the mechanical connector assembly comprises a recess and the LED module mechanical connector assembly comprises a projecting portion for releasably connecting to a corresponding recess on the mechanical connector assembly. Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 3B is a top view of the existing troffer of FIG. 3A from which the neon lights and the corresponding ballasts are removed;

FIG. 3C is a top view of a LED lighting retrofit kit which includes three LED lighting modules, the electrical retrofit connector assembly and the mechanical connector assembly in accordance with another embodiment;

FIG. 4A is a top view of an electrical retrofit connector assembly in accordance with another embodiment;

FIG. 4B is a top view of a mechanical connector assembly in accordance with another embodiment;

FIG. 4C is a perspective view of a wiring assembly forming part of the LED lighting retrofit kit in accordance with another embodiment;

FIG. 8 is a perspective view of an uninstalled LED lighting retrofit kit for three LED lighting modules in accordance with another embodiment.

It will be noted that throughout the appended drawings, like features are identified by like reference numerals.

DETAILED DESCRIPTION

In embodiments, there are disclosed LED lighting modules (i.e., Light Emitting Diode lighting modules), LED lighting systems (i.e., Light Emitting Diode lighting systems), LED lighting retrofit kits (i.e., Light Emitting Diode lighting retrofit kits) and electrical and mechanical receiving elements for receiving a LED lighting module or LED lighting modules.

Figure 1:
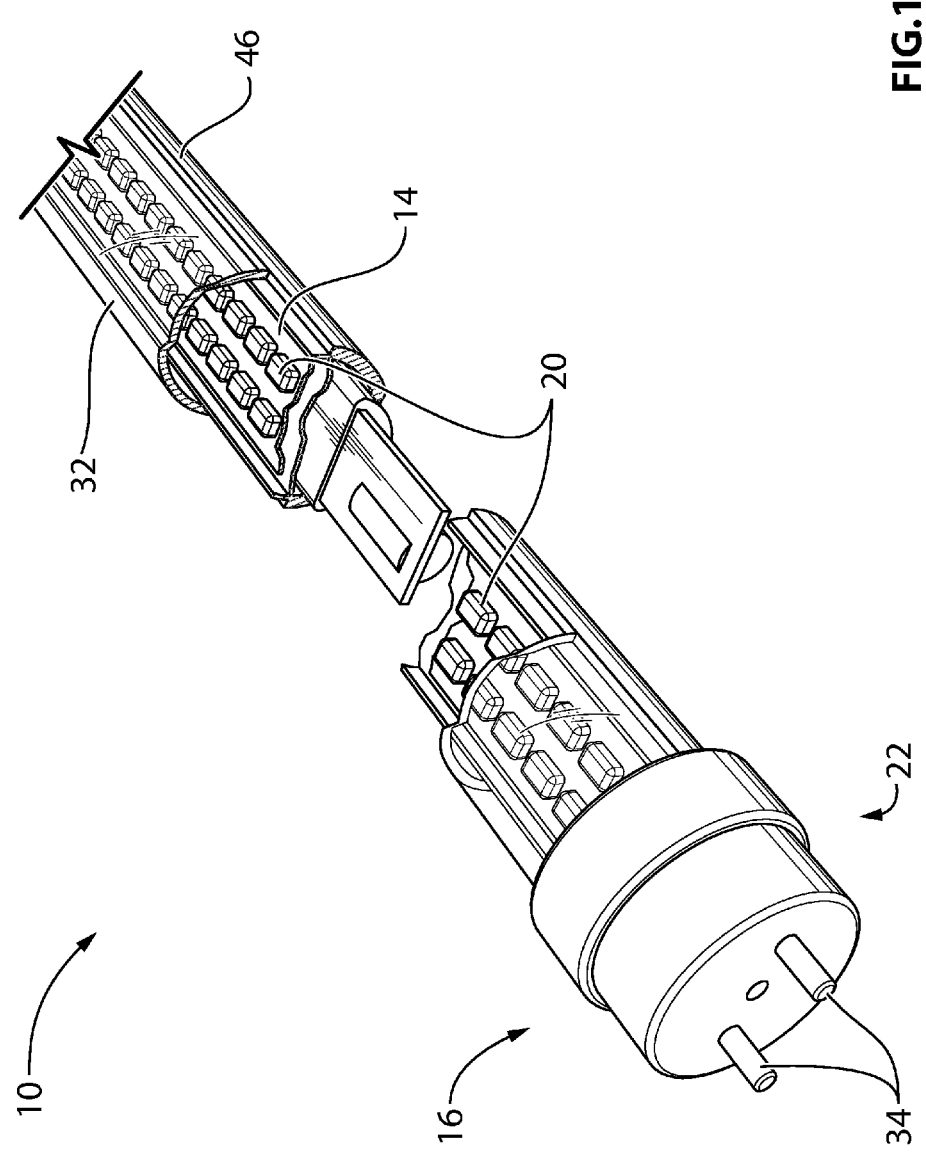
FIG. 1 is a perspective exploded view of a LED lighting module in accordance with an embodiment.
Figure 2:
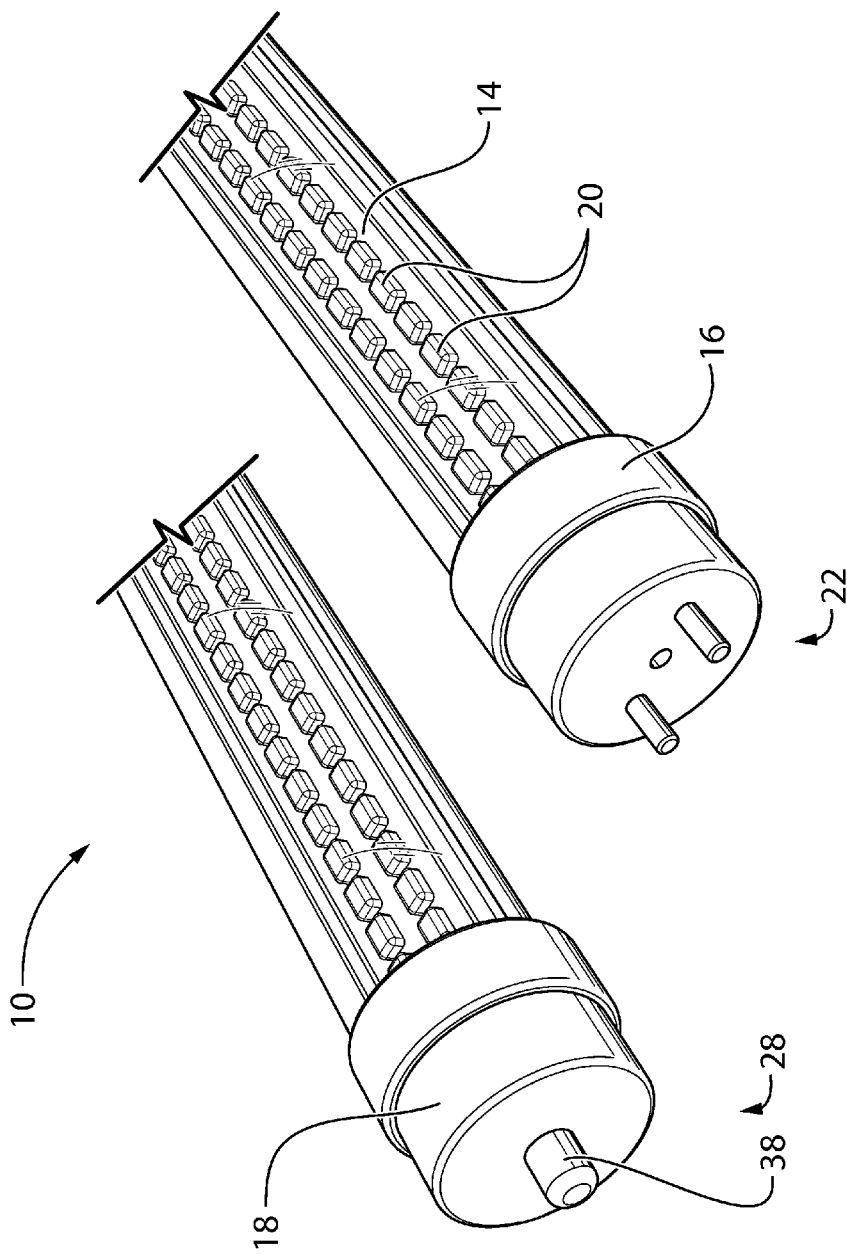
FIG. 2 is a perspective view of the LED module electrical connector assembly and the LED module mechanical connector assembly of the LED lighting modules in accordance with an embodiment.
Figure 3A:
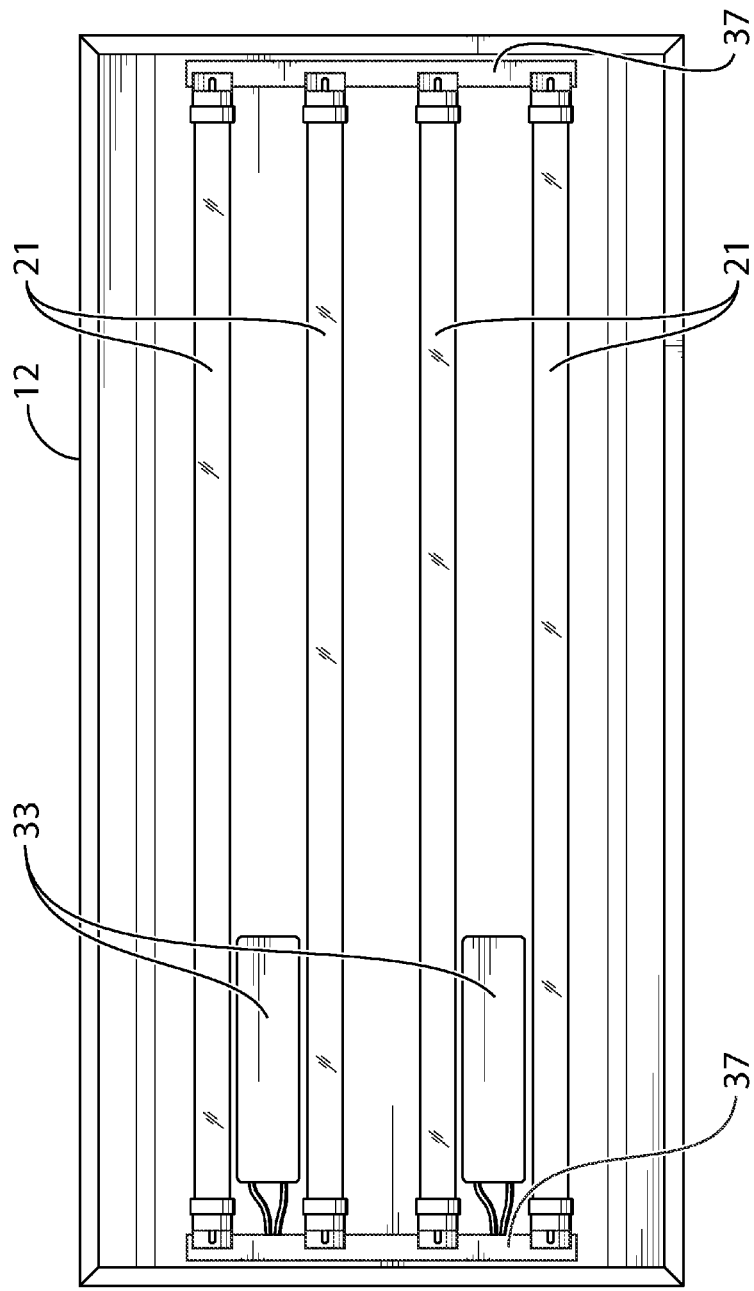
FIG. 3A is a top view of an existing troffer receiving four neon lights and the corresponding ballasts.
Figure 3D:
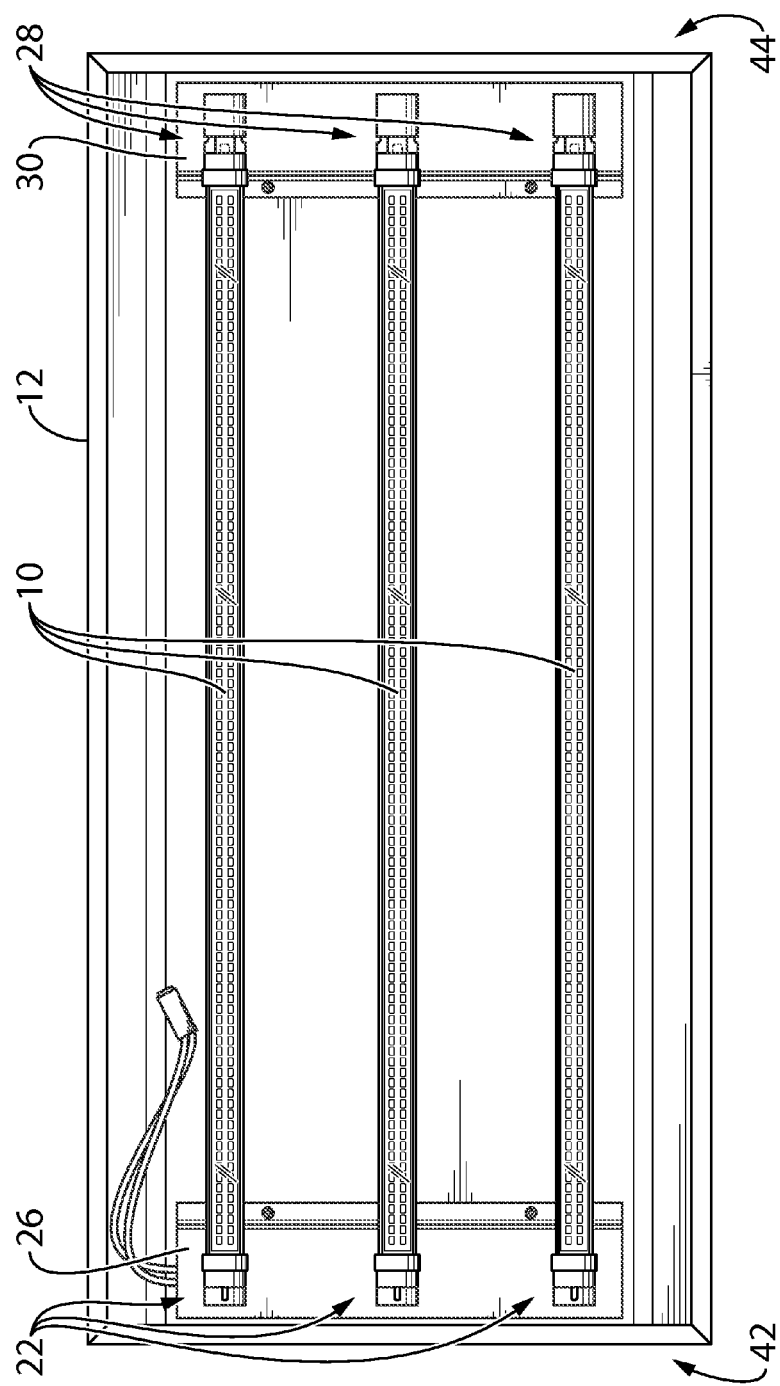
FIG. 3D is a top view of the installed LED lighting retrofit kit of FIG. 3C, with the three LED lights installed with the electrical retrofit connector assembly and mechanical connector assembly in accordance with another embodiment.

Referring now to the drawings, and more particularly to FIGS. 1-4C, there is shown a LED lighting module 10 forming part of a LED lighting system or of a LED lighting retrofit kit 200 (FIGS. 3C and 3D). The LED lighting retrofit kit 200 or the LED lighting system includes a troffer 12 (FIGS. 3A, 3B, 3C and 3D). The troffer 12 illustrated in the figures is an existing troffer. According to another embodiment (not shown), the LED lighting retrofit kit 200 can be installed in a new troffer (not shown).

The LED lighting module 10 includes a mounting surface 14. The mounting surface 14 includes a first end 16 (FIG. 1) and a second end 18 (FIG. 2). The LED lighting module 10 also includes a plurality of light emitting diodes (LEDs) 20 located on the mounting surface 14 and a LED module electrical connector assembly 22 (FIGS. 1 and 2). The LED module electrical connector assembly 22 is located proximate to the first end 16. The LED module electrical connector assembly 22 is for releasably connecting to an electrical retrofit connector assembly 26 (FIGS. 3C, 3D and 4A) located proximate a first end 42 of the troffer 12. The LED module electrical connector assembly 22 further electrically connects to the LEDs 20.

The LED lighting module 10 further includes a LED module mechanical connector assembly 28 (FIG. 2) which is located proximate the second end 18. In use, the LED module mechanical connector assembly 28 is for releasably connecting to a mechanical connector assembly 30 (FIGS. 3C, 3D and 4B) located proximate a second end 44 of the troffer 12 at a given distance from the electrical retrofit connector assembly 26. The LED module mechanical connector assembly 28 is for releasably and mechanically connecting the LED lighting module 10 to the troffer 12.

As shown in FIGS. 1-2, the LED lighting module 10 also includes a covering portion 32 covering the LEDs 20 and the mounting surface 14. The covering portion 32 of the LED lighting module 10 may be a polymer lens (i.e., a polycarbonate lens), or any suitable lens. The covering portion 32 may be ribbed to improve optical spread, impact resistant and made of a material such as to reduce cracks or discolor of the covering portion 32.

Also, the LED module electrical connector assembly 22 includes pin-like members 34 (aka pin members) for allowing an electrical connection to a corresponding recess 36 on the electrical retrofit connector assembly 26 (FIGS. 1, 2 and 4A). As shown, the LED module electrical connector assembly 22 includes two spaced apart pin-like members 34. It is however to be noted that the LED module electrical connector assembly 22 may include a plurality of pin-like members 34 or any other suitable connection for providing electric power (from an external power source) to the LEDs 20 mounted on the mounting surface 14. The covering portion 32 of the LED lighting module 10 may extend from a covering structure 46 which supports the mounting surface 14 which receives the LEDs 20. The LED lighting module 10 also includes one or more LED drivers which are not shown in the Figures.

As shown in FIGS. 2 and 4B, the LED module mechanical connector assembly 28 of the LED lighting module 10 includes a projecting portion 38 which outwardly extends from LED lighting module 10 for releasably connecting to a corresponding recess 40 on the mechanical connector assembly 30 (FIGS. 2 and 4B). According to an embodiment, projecting portion 38 is spring-loaded. It is to be noted that the projection portion 38 may adopt any suitable shape and configuration such as to mechanically hold the LED lighting module 10. The projecting portion 30 may include a plurality of projecting portions. The mechanical connector assembly 30 may include, without limitation, two or more pins, may be directly or indirectly fixed to a surface (i.e., a wall or ceiling surface), may be attached to the wall surface via a support and the like.

FIG. 4C shows, in more detail, the wiring assembly 27 which includes the corresponding recesses 36 and wiring to electrical connector 29. Electrical connector 29 is the interface to the building wiring (normally in the ceiling).

According to another embodiment (not shown), the LED module mechanical connector assembly 28 may include a plurality of projecting portions 38 which outwardly extends from LED lighting module 10 for releasably connecting to a plurality of corresponding recesses 40 on the mechanical connector assembly 30 (not shown). The projecting portions 38 and the corresponding recesses 40 may be of any suitable shape and configuration such as to releasably connect the LED lighting module 10 with the mechanical connector assembly 30.

According to another embodiment, FIG. 3A is a top view of an existing troffer 12 receiving four neon lights 21 and the ballasts 33. The neon lights 21 include pins 35 at each end for an adequate electrical connection to electrical connectors 37.

According to another embodiment, FIG. 3B is a top view of the existing troffer 12 of FIG. 3A from which the neon lights 21, the ballasts 33 and the electrical connectors 37 are removed. The first step in installing the LED lighting retrofit kit 200 is to remove the neon lights 21, the ballasts 33 and the electrical connectors 37.

Referring now to FIGS. 3C, 3D, and 4A to 4C, there is shown the installation of a LED lighting retrofit kit 200. In this embodiment, the LED lighting retrofit kit 200 is for installation in a troffer 12 defining a first end 42 and a second end 44. The LED lighting retrofit kit 200 includes an electrical retrofit connector assembly 26 which is installed proximate the first end 42 of the troffer 12 and a mechanical connector assembly 30 which is installed proximate the second end 44 of the troffer 12.

According to another embodiment, the electrical retrofit connector assembly 26 is for installation on a support member (not shown) and the electrical retrofit connector assembly 26 is for electrical connection to an external power source (not shown). The mechanical connector assembly 30 is for installation on the support member at a given distance from the electrical retrofit connector assembly 26. The support member includes any surface as well as any material adapted for receiving the electrical retrofit connector assembly 26 and the mechanical connector assembly 30. The support member also includes length of material (e.g., one or more bars or rod member made of any of metal, plastic, wood or any suitable material) on which the electrical retrofit connector assembly 26 and the mechanical connector assembly 30 can be installed and which, in turn, can be installed on a surface (e.g., ceiling, wall, under a counter, under or inside a cabinet, inside a closet or wardrobe, etc.).

The LED lighting retrofit kit 200 further includes LED lighting modules 10 for releasably connecting between the electrical retrofit connector assembly 26 and the mechanical connector assembly 30. FIG. 3D illustrates the troffer 12 after installation of the LED lighting retrofit kit 200 which includes three LED lighting modules 10 for interfacing with the electrical retrofit connector assembly 26 and mechanical connector assembly 30. In this case, four neon lights 21 were replaced by three LED lighting modules 10 because of the better lighting performance of the LED lighting modules 10. This means a cost savings not only in the number of LED lighting modules 10 used, but also because of the lower operating cost of the LED lighting modules vs. the neon lights 21.

In other embodiments, it would be possible for a LED lighting retrofit kit 200 to include one, two, three, four, five or more LED lighting modules 10 for interfacing with the electrical retrofit connector assembly 26 and mechanical connector assembly 30. It is to be noted that the electrical retrofit connector assembly 26 and mechanical connector assembly 30 may receive a plurality of LED lighting modules 10 (i.e., 1, 2, 3, 4, 5, 6, etc.).

In use, a user can releasably connect the LED module mechanical connector assembly 28 with the mechanical connector assembly 30 first, and then releasably connect the LED module electrical connector assembly 22 with the electrical retrofit connector assembly 26 by sliding the LED module electrical connector assembly 22 in the corresponding recess 36 of the electrical retrofit connector assembly 26 and rotating the LED lighting module 10 to connect it with the electrical retrofit connector assembly 26.

The previous embodiment shows that it is possible to releasably connect a LED lighting module 10 or a plurality of LED lighting modules 10 to electrical retrofit connector assembly 26 and mechanical connector assembly 30 of a troffer 12. However, according to another embodiment, it is also possible to releasably connect a LED lighting module 10 or a plurality of LED lighting modules 10 to electrical retrofit connector assembly 26 and mechanical connector assembly 30 which are mounted on a surface via an electrical receiving element 100 and via a mechanical receiving element 300 (FIGS. 5A, 5B, 6A and 6B).

Figure 5B:
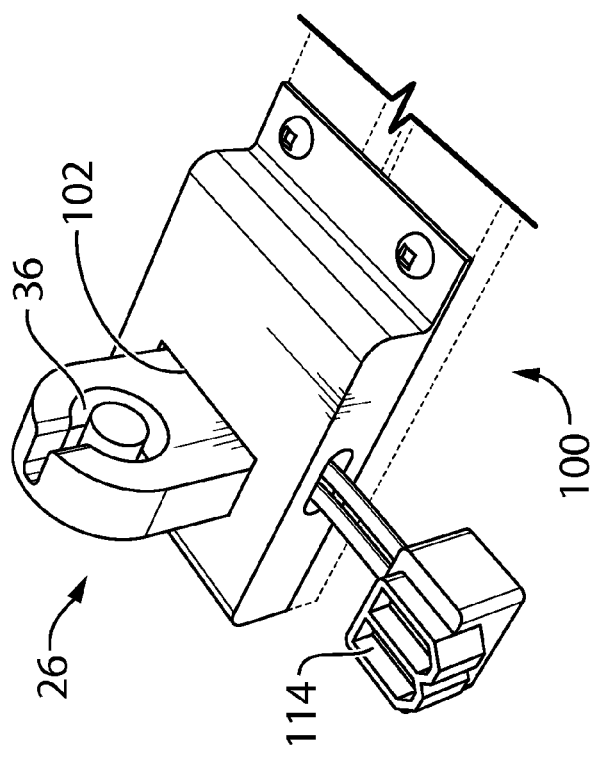
FIG. 5B is a perspective view of the electrical receiving element of FIG. 5A receiving an electrical retrofit connector assembly.
Figure 5A:
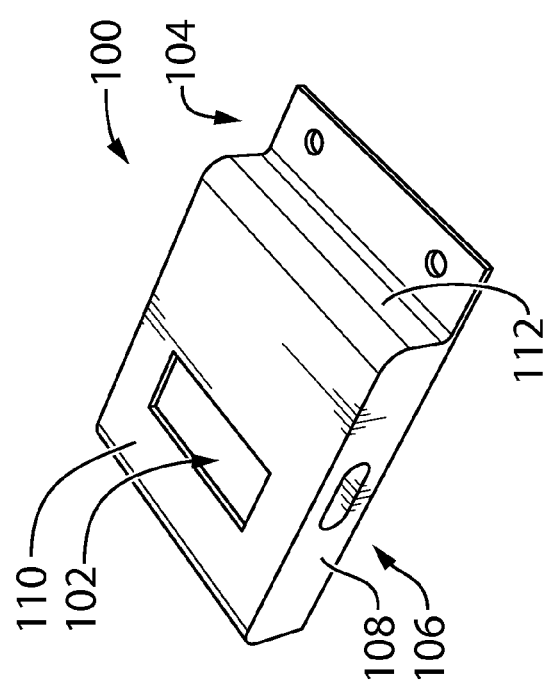
FIG. 5A is a perspective view of an electrical receiving element in accordance with another embodiment.

FIG. 5A is a perspective view of an electrical receiving element 100 in accordance with another embodiment. The electrical receiving element 100 includes four side walls (of which 108, 112 are shown), a top wall 110 defining an opening 102 and a bottom wall (not shown). At least one of the side walls 108, 112, top wall 110 and bottom wall may include an opening 106 for allowing passage of the wiring assembly 114. In FIG. 5A, side wall 108 allows for the passage of the wiring assembly 114. Having such an enclosure for the electrical receiving element 100 helps in obtaining certification of the LED lighting retrofit kit 200 by the certification authorities.

The electrical receiving element 100 further includes an attachment portion 104 for allowing its installation on a surface or a support member. As shown in FIG. 5A, the attachment portion 104 extends from side wall 112 for allowing a user to install the electrical receiving element 100 on the surface via nails, screws or any other suitable attachment manners.

FIG. 5B is a perspective view of the electrical receiving element 100 of FIG. 5A receiving the electrical retrofit connector assembly 26. As shown, the opening 102 of the electrical receiving element 100 is for connecting the electrical retrofit connector assembly 26 having the corresponding recess 36 to the electrical receiving element 100. Since the electrical receiving element 100 provides for an almost totally closed area (with the exception of opening 102 for the electrical retrofit connector assembly 26 and opening 106 for the wiring assembly 114), the wiring assembly 114 may be securely and easily contained within the electrical receiving element 100.

It is to be noted that the electrical receiving element 100 may adopt any shape and configuration such as to allow the wiring assembly 114 to be securely and easily contained in the electrical receiving element 100. Thus, the electrical receiving element 100 may include at least a wall defining an opening 102 for connecting with the electrical retrofit connector assembly 26, at least a wall defining an opening 106 for allowing passage of wiring assembly 114 and at least an attachment portion 104 for allowing a user to install the electrical receiving element 100 on the desired surface (not shown). It is to be noted that the top wall 110 of the electrical receiving element 100 may include one, two or a plurality of openings 102 for connecting to one, two or a plurality of electrical retrofit connector assemblies 26, each having a corresponding recess 36 for releasably connecting with the LED module electrical connector assembly 22 of the LED lighting module 10.

Figure 6B:
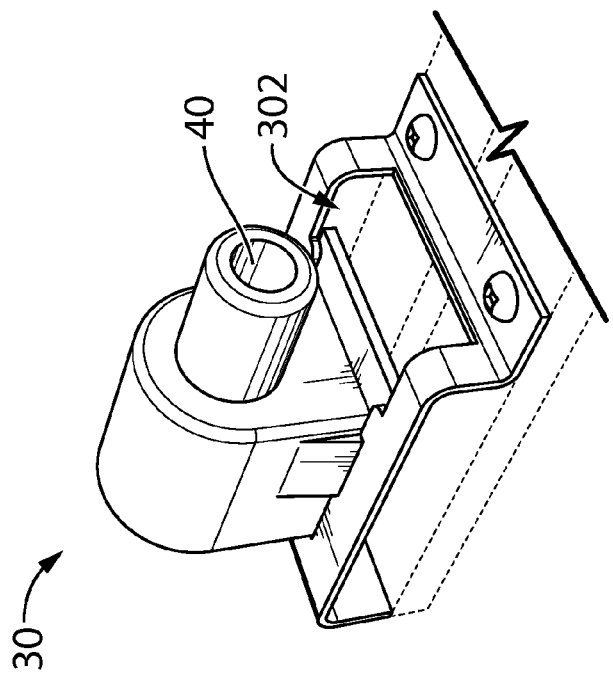
FIG. 6B is a perspective view of the mechanical receiving element of FIG. 6A receiving a mechanical connector assembly.
Figure 6A:
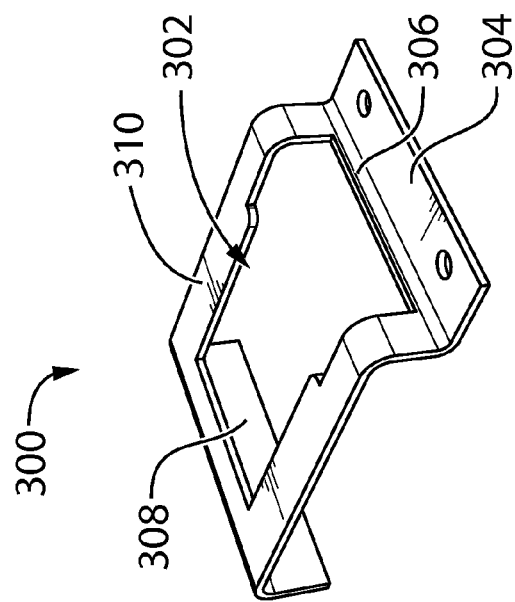
FIG. 6A is a perspective view of a mechanical receiving element in accordance with another embodiment.

FIG. 6A is a perspective view of a mechanical receiving element 300 in accordance with another embodiment. The mechanical receiving element 300 includes a front wall 306, a rear wall 308 and a top wall 310 defining an opening 302. On FIG. 6A, the mechanical receiving element 300 further includes an attachment portion 304 for allowing installation on a surface or a support member. As shown in FIG. 6A, the attachment portion 304 extends from the front wall 306 for allowing a user to install the mechanical receiving element 300 on the surface via nails, screws or any other suitable attachment manners.

FIG. 6B is a perspective view of the mechanical receiving element 300 of FIG. 6A receiving the mechanical connector assembly 30. As shown, the opening 302 of the mechanical receiving element 300 is for connecting the mechanical connector assembly 30 having the corresponding recess 40 to the mechanical receiving element 300. According to an embodiment, corresponding recess 40 is spring-loaded.

It is to be noted that the mechanical receiving element 300 may adopt any shape and configuration. Thus, the mechanical receiving element 300 may include at least a wall defining an opening 302 for connecting with the mechanical connector assembly 30 and at least an attachment portion 304 for allowing a user to install the mechanical receiving element 300 on the desired surface (not shown). It is also to be noted that the top wall 310 of the mechanical receiving element 300 may include one, two or a plurality of openings 302 for connecting to one, two or a plurality of mechanical connector assemblies 30, each having a corresponding recess 40 for releasably connecting with the LED module mechanical connector assembly 28 of the LED lighting module 10. With the electrical and mechanical receiving elements 100, 300, there is no need for installation of a troffer 12 since the electrical and mechanical receiving elements 100, 300 may be mounted directly on a desired surface, mounting rails, and the like.

In use, a user can mount on a desired surface a first one of the electrical and mechanical receiving elements 100, 300. Then, the user may mount the second one of the electrical and mechanical receiving elements 100, 300 aligned with the first one and at a predetermined distance (i.e., corresponding to the length of the LED lighting module 10). The user can then releasably connect the LED module mechanical connector assembly 28 with the mechanical connector assembly 30 of the mechanical receiving element 300 first, and then releasably connect the LED module electrical connector assembly 22 with the electrical retrofit connector assembly 26 of the electrical receiving element 100 by sliding the LED module electrical connector assembly 22 in the corresponding recess 36 of the electrical retrofit connector assembly 26 and rotating the LED lighting module 10 to connect it with the electrical retrofit connector assembly 26 of the electrical receiving element 100.

It is to be noted that, since LEDs 20 are more efficient, last longer, and are less sensitive to vibrations and low temperatures, a smaller number of LED lighting modules 10 is needed when replacing the neon lights 21 (i.e., four neon lights 21 in the existing troffer 12 prior to installation of the LED lighting retrofit kit 200 (FIG. 3A) vs. three LED lighting modules 10 in the troffer after installation of the LED lighting retrofit kit 200 (FIG. 3D)).

Figure 7:
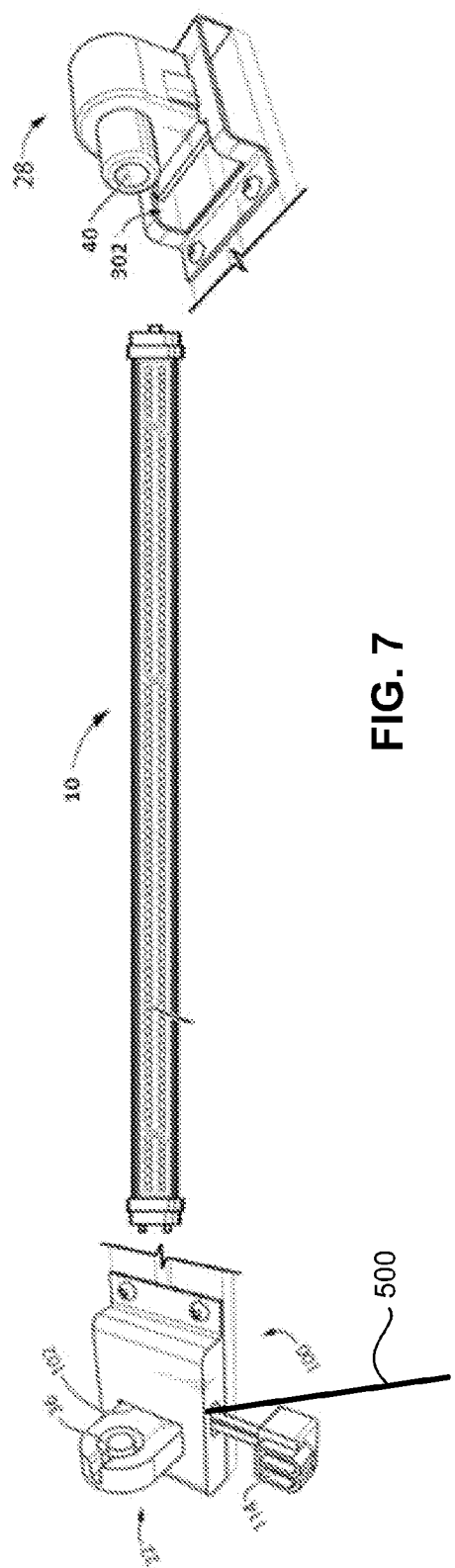
FIG. 7 is a perspective view of an uninstalled LED lighting retrofit kit for one LED lighting module in accordance with an embodiment.

FIG. 7 is a perspective view of uninstalled LED lighting retrofit kit for one LED lighting module 10 in accordance with embodiment. FIG. 7 illustrates that, with LED module electrical connector assembly 22 and LED module mechanical connector assembly 28, a user can install a LED lighting module 10 anywhere (i.e., on any desired surface and/or any part/portion of a desired surface), using only one electrical receiving element 100 and one mechanical receiving element 300. LED module electrical connector assembly 22 includes the wiring assembly 114, while LED module mechanical connector assembly 28 acts only as a mechanical support for the LED lighting module 10. Electrical receiving element 100 and mechanical receiving element 300 may be installed for direct retrofit in any type of existing commercial, residential and industrial luminaires or troffers, or directly on any type of surface without luminaires, troffers or any type of casings, such as metal casings, normally used with fluorescent modules.

FIG. 8 is a perspective view of an uninstalled LED lighting retrofit kit for three LED lighting modules in accordance with another embodiment. FIG. 8 illustrates that, with LED module electrical connector assemblies 22 (i.e., for example three LED module electrical connector assemblies 22) and LED module mechanical connector assemblies 28 (i.e., three LED module mechanical connector assemblies 28), a user can install a plurality of LED lighting modules 10 anywhere (i.e., on any desired surface and/or any part/portion of a desired surface), using a plurality of electrical receiving elements 100 and a plurality of mechanical receiving elements 300. Thus, the user will be able to install not just one LED lighting module 10, but a plurality of LED lighting modules 10 as desired and needed (i.e., three LED lighting module 10).

It is to be noted that all LED module electrical connector assemblies 22 are safe and may be certified by UL or CSA and may act as luminaires by themselves with ground wires 500 (FIG. 7).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A LED lighting retrofit kit for installation on a support member, the LED lighting retrofit kit comprising:
   an electrical receiving element comprising an attachment portion adapted for installing the electrical receiving element on the support member;
   an electrical retrofit connector assembly adapted for releasable mechanical connection to the electrical receiving element, the electrical retrofit connector assembly for electrical connection to an external power source;
   a mechanical receiving element comprising an attachment portion adapted for installing the mechanical receiving element on the support member;
   a mechanical connector assembly adapted for releasable mechanical connection to the mechanical receiving element defining a predetermined distance from the electrical connector assembly to the mechanical connector assembly; and
   a LED lighting module for releasably connecting between the electrical retrofit connector assembly and the mechanical retrofit connector assembly, the LED lighting module comprising:
      a LED module electrical connector assembly for releasably electrically connecting to the electrical retrofit connector assembly; and
      a LED module mechanical connector assembly for releasably mechanically connecting to the mechanical connector assembly.

2. The LED lighting retrofit kit of claim 1, wherein the connection between the LED module mechanical connector assembly and the mechanical connector assembly is exclusively mechanical, that is, without any electrical connection.

3. The LED lighting retrofit kit of claim 1, wherein the electrical retrofit connector assembly comprises a recess and the LED module electrical connector assembly comprises a pin member for electrically connecting to the recess on the electrical retrofit connector assembly.

4. The LED lighting retrofit kit of claim 3, wherein the LED module electrical connector assembly comprises a plurality of spaced apart pin members.

5. The LED lighting retrofit kit of claim 1, wherein the mechanical connector assembly comprises a recess and the LED module mechanical connector assembly comprises a projecting portion for releasably connecting to the recess on the mechanical connector assembly.

6. The LED lighting retrofit kit of claim 1, wherein the electrical receiving element is substantially closed and comprises an opening allowing passage of electrical wiring.

7. The LED lighting retrofit kit of claim 1, further comprising an attachment portion extending from the electrical receiving element, the attachment portion for mounting to the support member.

8. The LED lighting retrofit kit of claim 1, further comprising an attachment portion extending from the mechanical receiving element, the attachment portion for mounting to the support member.

9. A LED lighting system for connection to a power source, the LED lighting system comprising:
   a troffer defining a first end and a second end;
   an electrical receiving element comprising an attachment portion adapted for installing the electrical receiving element on the troffer;
   an electrical retrofit connector assembly located proximate the first end of the troffer, adapted for releasable mechanical connection to the electrical receiving element and for electrical connection to the power source; and
   a mechanical receiving element comprising an attachment portion adapted for installing the mechanical receiving element on the support member;
   a mechanical connector assembly located proximate the second end of the troffer and adapted for releasable mechanical connection to the mechanical receiving element; and
   a LED lighting module for releasably connecting between the electrical retrofit connector assembly and the mechanical connector assembly, the LED lighting module comprising:
      a LED module electrical connector assembly for releasably electrically connecting to the electrical retrofit connector assembly; and
      a LED module mechanical connector assembly for releasably mechanically connecting to the mechanical connector assembly.

10. The LED lighting system of claim 9,
    wherein the electrical retrofit connector assembly comprises a plurality of electrical retrofit connector assemblies spaced apart and proximate the first end of the troffer;
    wherein the mechanical connector assembly comprises a plurality of mechanical connector assemblies spaced apart and proximate the second end of the troffer; and
    wherein the LED lighting system comprises a plurality of LED lighting modules for connection between a respective pair made of one electrical retrofit connector assembly of the a plurality of electrical retrofit connector assemblies and one mechanical connector assembly of the plurality of mechanical connector assemblies.

11. The LED lighting system of claim 9, wherein the LED module electrical connector assembly comprises a pin member electrically connected to a corresponding recess on the electrical retrofit connector assembly.

12. The LED lighting system of claim 11, wherein the LED module electrical connector assembly comprises a plurality of spaced apart pin members electrically connected to a plurality of corresponding recesses on the electrical retrofit connector assembly.

13. The LED lighting system of claim 9, wherein the LED module mechanical connector assembly comprises a projecting portion releasably connected to a corresponding recess on the mechanical connector assembly.

14. The LED lighting retrofit kit of claim 1, wherein the electrical retrofit connector assembly comprises a plurality of electrical retrofit connectors and the mechanical connector assembly comprises a plurality of mechanical connectors.

15. The LED lighting retrofit kit of claim 9, wherein the electrical retrofit connector assembly comprises a plurality of electrical retrofit connectors and the mechanical connector assembly comprises a plurality of mechanical connectors.

16. A LED lighting retrofit kit for installation on a support member and for releasably connecting a LED lighting module comprising a LED module electrical connector assembly and a LED module mechanical connector assembly, the LED lighting retrofit kit comprising:

an electrical receiving element comprising an attachment portion adapted for installing the electrical receiving element on the support member;

an electrical retrofit connector assembly adapted for releasable mechanical connection to the electrical receiving element, the electrical retrofit connector assembly for electrical connection to an external power source;

a mechanical receiving element comprising an attachment portion adapted for installing the mechanical receiving element on the support member; and a mechanical connector assembly adapted for releasable mechanical connection to the mechanical receiving element defining a predetermined distance from the electrical connector assembly to the mechanical connector assembly;

wherein the LED module electrical connector assembly is for releasably electrically connecting to the electrical retrofit connector assembly and the LED module mechanical connector assembly is for releasably mechanically connecting to the mechanical connector assembly.

\* \* \* \* \*